Figure 1:
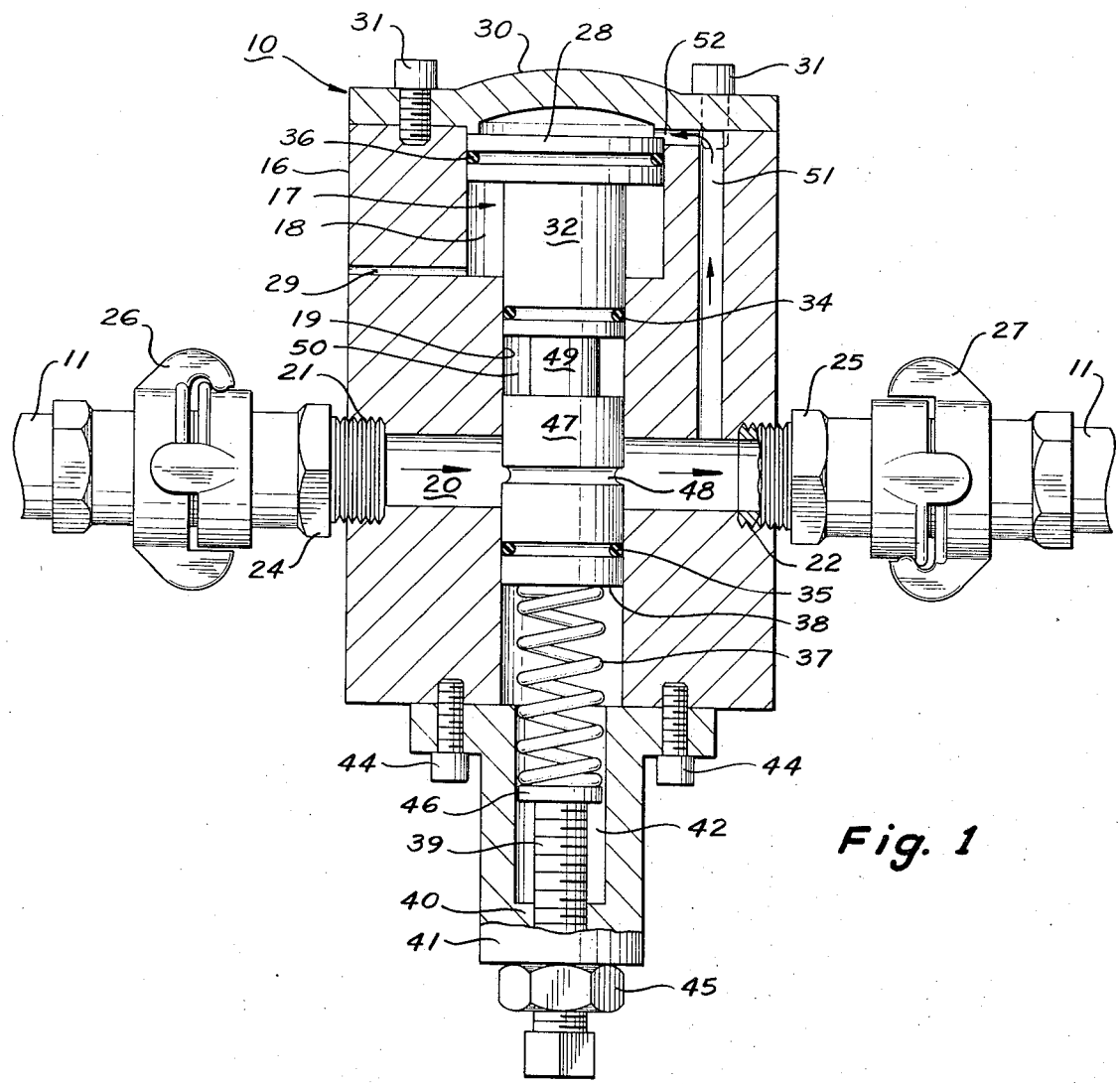

ically to the tool below a predetermined value such as will occur upon breakage of the supply line. The safety valve structure includes a casing defining an axially extending cylinder having a piston reciprocable therein. A flow passage intersects and traverses the cylinder, and a valve element carried by the piston so as to be movable therewith is adapted to open and close the flow passage so as to control the movement of air therethrough. The piston is spring biased toward an inactive position in which the valve element is in its closed position; and a channel provided by the valve element permits a controlled minimum-flow of air therepast to the downstream side of the flow passage whenever the valve element is closed. A passageway interconnecting the downstream end portion of the flow passage and an end portion of the cylinder is adapted to permit the development of a pressure within the cylinder space effective to displace the piston against the biasing force of the spring into its active position in which the valve element is opened. Any sharp reduction in pressure in the downstream end portion of the flow passage enables the spring to return the piston and valve element to their inactive and closed positions, respectively.

United States Patent [19]

Miller

[11] 3,792,714
[45] Feb. 19, 1974

[54] SAFETY VALVE STRUCTURE
[76] Inventor: William S. Miller, 2306-32rd Ave., San Francisco, Calif. 94116
[22] Filed: May 4, 1972
[21] Appl. No.: 250,207

[52] U.S. Cl. ............................................. 137/494
[51] Int. Cl. ........................................ F16k 31/143
[58] Field of Search 137/462, 460, 494, 498, 543.23

[56] References Cited
UNITED STATES PATENTS

| | | | |
|---|---|---|---|
| 2,304,404 | 12/1942 | Flanagan | 137/462 |
| 2,623,725 | 12/1952 | Sands | 137/543.23 X |
| 1,959,909 | 5/1934 | Farmer | 137/494 |
| 2,346,223 | 4/1944 | Lyon et al. | 137/462 |
| 2,346,224 | 4/1944 | Lyon et al. | 137/462 |
| 2,597,582 | 5/1952 | Gruss | 137/494 X |

Primary Examiner—Henry T. Klinksiek
Attorney, Agent, or Firm—Joseph B. Gardner, Esq.

[57] ABSTRACT

A safety valve structure for use in the pneumatic supply line between an air compressor and an pneumatic tool operated thereby to sharply reduce the flow of air through the supply line in response to an abnormal decrease in pressure adjacent the tool below a predetermined value such as will occur upon breakage of the supply line.

3 Claims, 2 Drawing Figures

SAFETY VALVE STRUCTURE

This invention relates to pneumatic compressor and tool systems and, more particularly, to a safety valve structure useful in such system intermediate the output of the compressor and input of the tool — advantageously in close proximity to the former.

Pneumatic tools such as paving breakers, hammers of various types, sheeting drivers, rock drills, etc. are energized by delivery thereto of air under pressure through a relatively flexible conduit. The length of the conduit may vary considerably, and the pressure at which the compressed air is delivered to the tool may also vary considerably depending upon the consumption and air pressure requirements of the particular tool, the capacity of the compressor supplying the air, the condition of the compressor, number of tools connected therewith, and other factors. In a typical system, a portable engine-driven compressor is used which is able to deliver compressed air at a pressure of the order of 100 psig, the tool will be a percussive or impact tool such as a paving breaker or jackhammer, and the operative interconnection between the compressor and tool is defined by a length of flexible hose or conduit that, simply by way of example, may have a length of 20 feet. The compressor operates continuously to provide a readily available source of compressed air, and the tool is operated intermittently under the control of an operator.

Occasionally a hose or supply line interconnecting the compressor and tool will rupture, otherwise break, be broken, or become accidently disconnected, and because compressed air continues to be delivered through the disconnected conduit at full line pressure and at the flow-delivery capacity of the compressor, the loose conduit will flay or snake violently, thereby being extremely dangerous and often causing severe injury to adjacent personnel. Such occurrences have caused the Federal Department of Labor to issue regulations concerning such matters, one of which requires that all hoses or supply lines exceeding one half inch inside diameter to have a safety device at the source of supply or branch line to reduce the pressure in case of hose failure.

In view of the foregoing, an object of the present invention is to provide an improved safety device for use in a fluid supply line to obviate the hazards noted and to satisfy the safety requisites noted in the aforementioned regulations. Another object of the invention is in the provision of an improved safety device of the type described which takes the form of a safety valve structure adapted to be used in a pressurized fluid supply line and operative to sharply reduce the flow of fluid therethrough in response to an abnormal decrease in pressure below a predetermined value downstream of the valve as, for example, an abnormal pressure decrease of the type that will occur upon failure of such supply line.

Further objects, among others, of the present invention are in the provision of a safety valve structure of the character described that has a casing defining an axially extending cylinder therein intersected and traversed by a flow passage, a piston being reciprocable within the cylinder between active and inactive positions to displace a valve element operatively connected with the piston between closed and open positions, the valve element being provided with a flow channel enabling a controlled minimum-flow of fluid therepast when the valve element is in the closed position thereof, and in which a passageway interconnects the flow passage downstream of the valve element and a portion of the cylinder space so as to develop a pressure force therein of sufficient magnitude to displace the piston, against a continuous biasing force opposing displacement thereof, toward an active position in which the valve element is opened to permit free flow of fluid through the passage, any sharp decrease in the pressure downstream of the valve element resulting in a corresponding diminution in the pressure force urging the piston toward its active position, thereby enabling the biasing force to return the piston to an inactive position and the valve carried thereby to the closed position thereof.

Additional objects and advantages of the invention, especially as concerns particular features and characteristics thereof, will become apparent as the specification continues.

Figure 2:
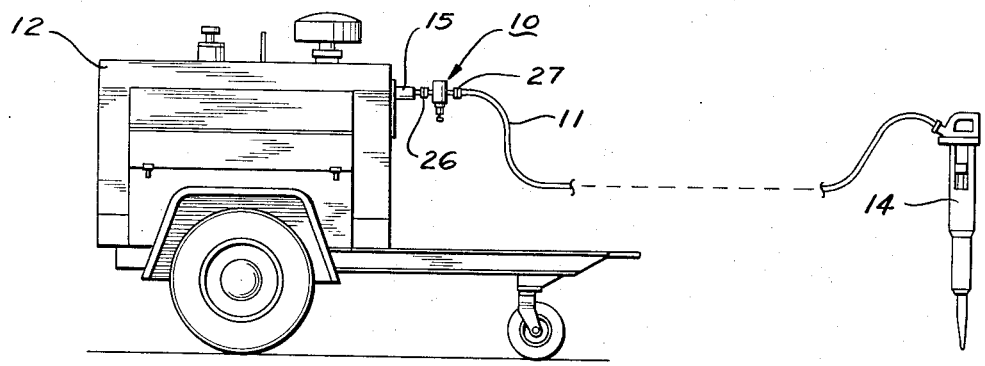

An embodiment of the invention is illustrated in the accompanying drawing, in which:

FIG. 1 is a longitudinal sectional view through a safety valve embodying the present invention; and FIG. 2 is a side view in elevation illustrating the safety valve of FIG. 1 in operative association with a portable air compressor and paving breaker connected thereto so as to receive pressurized air therefrom.

The safety valve illustrated in the drawing is denoted in its entirety with the numeral 10, and it is shown in FIG. 2 interposed in the supply line 11 delivering air under pressure from a compressor unit 12 to a utilization device 14 in the form of a percussive tool. For purposes of the present invention, the characteristics of the compressor 12 and utilization device 14 are of no particular significance per se, and the typifying instances illustrated in FIG. 2 are a portable air compressor (for example, a Gyro-Flo 150-cfm portable compressor manufactured by Ingersoll-Rand of Mocksville, North Carolina) and a heavy-duty pneumatic paving breaker (as, for example, a Model CB8 manufactured by Rand-Air Co., of Easton, Pennsylvania). As is well known, the compressor 12 functions to provide at an outlet or delivery connection 15 a relatively continuous supply of compressed air having a relatively constant pressure. For example, the compressor 12 in the illustrative instance noted may be operative to deliver to the outlet 15 approximately 150 cubic feet of compressed air per minute at a pressure of the order of 100 psig. The flexible conduit 11 is coupled to the point of delivery 15, and supplies compressed air to the tool 14 in accordance with the requirements thereof which are determined by manual manipulation of a control valve forming a part of the tool.

Referring to FIG. 1 in particular, the safety valve structure 10 is seen to include a casing 16 defining an axially extending cylinder 17 therein. The cylinder 17 has a stepped configuration providing an upper end portion 18 of relatively large diameter and a lower portion 19 of smaller diameter communicating directly therewith. The casing 16 further defines a flow passage 20 therethrough having both an inlet 21 and outlet 22 each of which is equipped with internal threads so as to receive, respectively, fittings 24 and 25 therein. The fittings 24 and 25 are each coupled to the conduit 11 by quick-connectors 26 and 27, respectively. The quick-connectors 26 and 27, couplings or fittings 24 and 25, and hose or conduit 11 are all conventional and form no part of the present invention.

Mounted for reciprocation within the cylinder 17 and, more particularly, the enlarged upper end portion 18 thereof is a piston 28. The piston sealingly engages the circumjacent walls of the enlarged cylinder end portion 18, and is axially displaceable therewithin between an upper inactive position (which is illustrated in FIG. 1) and an active position displaced axially therefrom. The cylinder space below the piston 28 is maintained at atmospheric pressure via an axhaust passage 29, and the cylinder space above the piston 28 is closed by a cylinder head 30 removably secured to the casing 16 by means of a plurality of cap screws 31. As will be explained hereinafter, the cylinder space above the piston 28 is pressurized to develop a force operative against the piston and effective to displace the same downwardly toward the active position thereof.

The piston 28 also has an elongated stem 32 of reduced cross section which is slidably received within the cylinder space 19 and is axially reciprocable with respect thereto. The piston stem 32 is sealingly related to the cylinder space 19 on opposite sides of the flow passage 20 by a pair of seals 34 and 35 which may take any suitable form, such as the O-ring seals shown. The piston or piston head 28 is similarly related to the enlarged upper end portion 18 of the cylinder by an O-ring seal 36 or its equivalent, as previously noted.

The composite piston 28,32 is urged toward the upper inactive position thereof by biasing means in the form of a helical compression spring 37 that at its upper end bears against the downwardly facing surface 38 of the piston stem 32 and at its lower end seats upon an adjustable stop 39. It will be apparent that the spring 34 continuously imparts a biasing force to the downwardly-facing surface 38 of the composite piston 28,32, and that the magnitude of such force (within the parameters defined by the characteristics of the spring) can be increased and decreased, selectively, by appropriate adjustment of the stop 39. In this respect, the stop 39 is generally in the form of a threaded bolt projecting through and threadedly engaging the lower end wall 40 of a spring support 41. The support 41 has an axially extending bore or opening 43 therein adapted to align axially with the cylinder space 19 when the support 41 is secured to the casing 16, as by means of a plurality of cap screws 44. The stop 39 can be locked in any position of adjustment by a locking nut 45, as is well known. The stop 39 has an enlargement 46 at its upper end which may be removably secured thereto, such as by means of a cap screw (not shown), so as to accommodate assembly of the unit.

The safety valve structure 10 further includes a valve element movable between open and closed positions to respectively permit relatively free flow of fluid through said passage 20 from the inlet 21 to the outlet 22 thereof and to decrease such flow therethrough. Further, means are provided that operatively interconnect the piston 28,32 and such valve element to make the latter responsive to the former so that the valve element is selectively open and closed when the piston is respectively in the active and inactive positions thereof. In the form shown, the valve element is denoted with the numeral 47, and it is carried by the piston stem 32 for reciprocable displacements therewith. In even more particular terms, the valve 47 is formed integrally with the piston stem 32, wherefore the means operatively interconnecting the piston and valve element constitute the integrality of these two components.

It will be evident that the valve element 47 in being axially reciprocable within the cylinder space 19 traverses the flow passage 20 so as to control or regulate the flow of fluid therethrough. More particularly in this reference, the valve element 47 has substantially the same diameter as that of the cylinder space 19 so as to substantially fill the same, and it also has an axial length greater than the diameter of the flow passage 20 so as to substantially close the same and thereby inhibit or limit the flow of fluid therethrough when the valve element is in the closed position thereof illustrated in FIG. 1. However, the safety valve structure 10 has pressure-maintenance means bypassing the valve element 47 in the closed position thereof to accommodate a controlled flow of pressure-developing fluid from the inlet end portion of the passage 20 to the outlet end portion thereof. In the form shown, such pressure-maintenance means is provided by the valve element itself, and may constitute a channel 48 either through or circumjacent (as shown) the valve element to accommodate a controlled leakage or minimum-flow of fluid therethrough whenever the valve element is closed. Accordingly, the pressure-maintenance means is operative only when the valve element 47 is in the closed position thereof, and the size and flow capacity thereof is selected in accordance with the environmental conditions and requirements.

It will be observed in FIG. 1 that the piston stem 32 or valve element 47 (depending upon how one wishes to view the matter) has a restricted portion 49 of reduced diameter defining a relatively large annulus or annular space 50 with the circumjacent walls of the cylinder space 19. When the valve element 47 is displaced downwardly into the open position thereof by energization of the piston 28, the annulus 50 is in substantial alignment with the flow passage 20, thereby permitting relatively free flow of fluid therepast from the inlet 21 to the outlet 22 of the flow passage. The size of the annulus 50 is selected so that substantially no interference with the flow of fluid therethrough is caused by the restriction 49.

The safety valve structure 10 further includes means for developing within a portion of the cylinder 18 a pressure proportional in magnitude to the contemporary value of the pressure in the passage 20 downstream of the valve element 47 and operative against the piston to urge the same toward the active position thereof against the biasing force of the spring 37 whenever the pressure downstream of the valve element exceeds some predetermined value. In the form shown, such means includes a passageway 51 extending between the flow passage 20 adjacent the outlet 22 thereof and the upper end portion of the cylinder space 18 through a port or opening 52 connecting the passageway 51 with the cylinder space. More particularly, the passageway 51 is connected with the cylinder space above the piston 28 so that the pressure fluid active within such space develops an axially oriented force tending to displace the piston 28 downwardly toward the active position thereof in which the valve element 47 is open. It will be apparent that the pressure present within the upper end portion of the cylinder space 18 will have substantially the same value as the pressure of the fluid in the passage 20 adjacent the outlet 22 thereof, and that the cross-sectional area of the piston 28 is selected so that the magnitude of the pressure force acting downwardly thereagainst will be effective to overcome the biasing force of the spring 37 whenever the pressure adjacent the outlet 22 is in excess of some predetermined value.

In operation of the safety valve structure 10, it is attached along a flow conduit 11 between a compressor 12 and tool 14 preferably close to the source of the pressure fluid which in the usual instance is adjacent the compressor 12, as shown in FIG. 2. Assuming the condition in which the compressor 12 is delivering compressed air at the usual line pressure (for example, of the order of 100 psig) and that the control valve of the tool 14 is closed, the valve element 47 and piston 28,32 will be initially in the closed and inactive positions thereof, respectively, because of the biasing force of the spring 37. However, the pressure developing within the downstream or outlet end portion 22 of the passage 20 will very quickly approximate the line pressure because of the interconnection of the inlet and outlet end portions of the passage 20 via the pressure-maintenance or leakage means 48. This same pressure will therefore be present in the passageway 51, opening 52, and upper end portion of the cylinder space 18, thereby developing a pressure force active downwardly upon the piston 28 to displace the same into its active position and consequently displace the piston element 47 into the open position thereof. At this time, then, the large annular space 50 will be in alignment with the flow passage 20 so that the flow system will then function essentially the same as in the complete absence of the valve structure 10.

This condition of the valve structure 10 will be maintained as long as the compressor 12 is delivering compressed air at the rated pressure value therefor. If the compressor 12 should terminate its delivery of compressed air, or should be pressure value thereof drop substantially, the pressure within the flow passage 20 and downstream end portion thereof will fall, and when a pressure value is reached at which the pressure force acting downwardly upon the piston 28 is no longer superior to the mechanical spring force urging the piston into its inactive position, the piston and valve element will be respectively returned to the inactive and closed positions shown in FIG. 1. As long as the compressor 12 continues to deliver compressed air at or near the pressure value, the valve element 47 will remain in its open position irrespective of whether the tool 14 is operative or inoperative since the capacity of the compressor 12 is sufficient to adequately supply the tool 14 when the throttle valve thereof is completely open.

Should the conduit 11 break adjacent the tool 14, or the connector between the conduit and tool fail, or for some other reason the pressure in the conduit 11 sharply falls below some predetermined value (say, for example, to a value of the order of 60 psig), such sharp reduction in pressure will also be present at the outlet 22 of the flow passage 20, thereby resulting in a corresponding reduction in pressure in the passageway 51, opening 52, and cylinder space above the piston 28. As a result, the pressure force acting downwardly upon the piston 28 will no longer be superior in magnitude to the biasing force of the spring 37, thereby permitting the spring to quickly displace the piston and valve element upwardly so as to close the passage 20. Thus, the large-volume escape of high-pressure air which otherwise would occur is quickly prevented.

In this respect, it will apparent that the permissible minimum flow or leakage accommodated by the channel 48 through the piston element 47 is sufficiently small that it will not cause the broken conduit to whip and snake which is a dangerous occurrence, as previously noted. The leakage or minimum flow accommodated by the channel 48 will be continuous, however, as long as the compressor 12 continues to deliver pressurized fluid to the inlet 21 of the valve structure 10. The magnitude of the escape, however, can be made as small as believed necessary or desirable simply by reducing the size of the channel 48 since any reduction in the size thereof will further inhibit the flow of air therethrough. It should be noted in this reference that any reduction in the size of the channel 48 will reduce the rate at which the valve structure 10 is changed from a dormant to an operative state in which the piston 28,32 is displaced into its active position and the valve element 47 correspondingly opened whenever the compressor 12 is energized.

The stop 39 may be adjusted as a factory of manufacturing procedure so as to establish the magnitude of the biasing force defined by the spring 37, although it could be adjusted as a field procedure as, for example, for purposes of compensating for variations in the output pressure of different compressors. Further, the mechanical biasing force imparted by the spring 37 could be replaced by a pressure-force biasing system such as by closing the space below the downwardly-facing surface 38 of the valve element 47 and pressurizing the closed space by connection thereof with inlet end portion of the passage 20. The differential pressure forces resulting from the smaller cross section of the surface 38 and larger cross section of the piston 28 would permit operation of such system.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A safety valve structure for use in pressurized fluid supply lines and the like to sharply reduce the flow of fluid therethrough in response to an abnormal decrease in pressure below a predetermined value downstream of the valve structure, comprising: a casing defining a cylinder therein and further defining a flow passage for such fluid having both an inlet and an outlet therefor; a piston reciprocable within said cylinder between active and inactive positions; a valve element forming a part of the piston and movable with the piston between open and closed positions to respectively permit relatively free flow of fluid through said passage and to decrease such flow therethrough; said piston including said valve element being capable of being in different positions in the cylinder without varying its operational relationship with the cylinder; said valve element being selectively open and closed when said piston is respectively in the active and inactive positions thereof; biasing means operative to urge said piston toward the inactive position thereof; said cylinder having a substantially closed portion at one end thereof in communication with one end of said piston; means for developing within said portion of said cylinder a pressure proportional in magnitude to the contemporary value of the pressure downstream of said valve element and operative against said piston to urge the same toward the active position thereof and effective to displace the piston into its active position against the force of said biasing means; and pressure-maintenance means comprising a passage in the valve communicating with said inlet and outlet of said flow passage.

2. A safety valve structure in accordance with claim 1, in which said pressure maintenance means comprises an exposed annular passage surrounding the valve element and positioned to lie in the flow passage in the closed position of the valve.

3. A safety valve structure in accordance with claim 1 characterized by the piston having its upper end portion reciprocable in said substantially closed cylinder portion, said cylinder excepting said closed portion being of the same diameter throughout its length, the said substantially closed portion being axially aligned and contiguous with the remainder of the cylinder, said pressure maintenance means comprising an annular passage surrounding the valve element of the piston and positioned to lie in the flow passage in the closed position of the valve element.

* * * * *